Aug. 13, 1929.  W. W. LANDSIEDEL  1,724,880
AUTOMATIC BLANK OPERATION CONTROLLING DEVICE
Filed Sept. 20, 1927  2 Sheets-Sheet 1
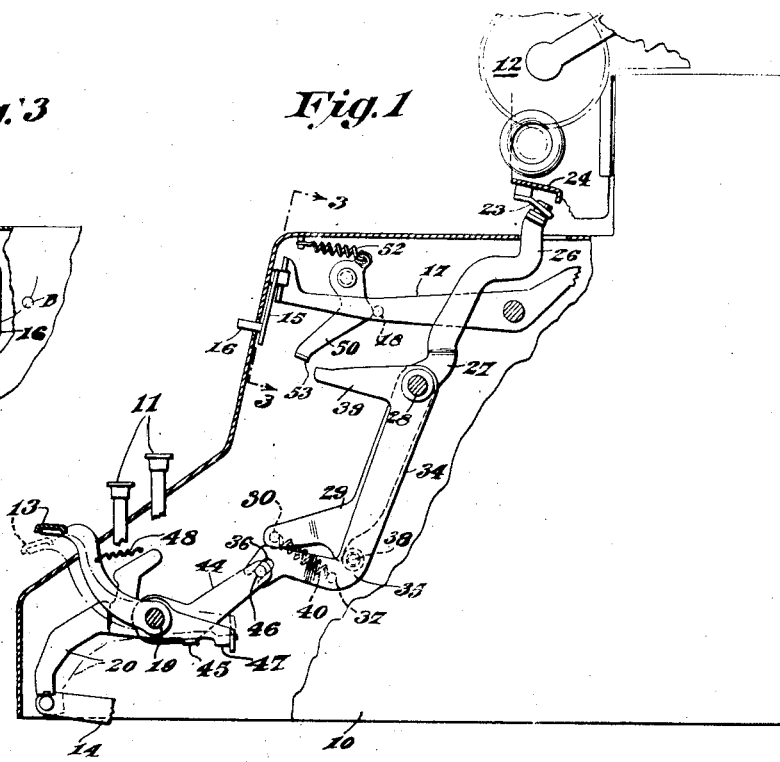
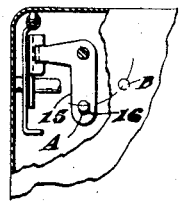
Inventor
Walter Wm. Landsiedel
by Barton A. Bean Jr.
Attorney

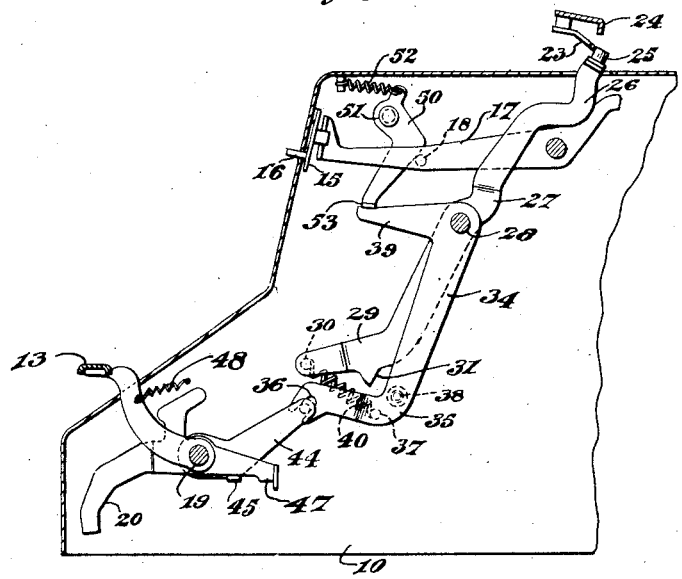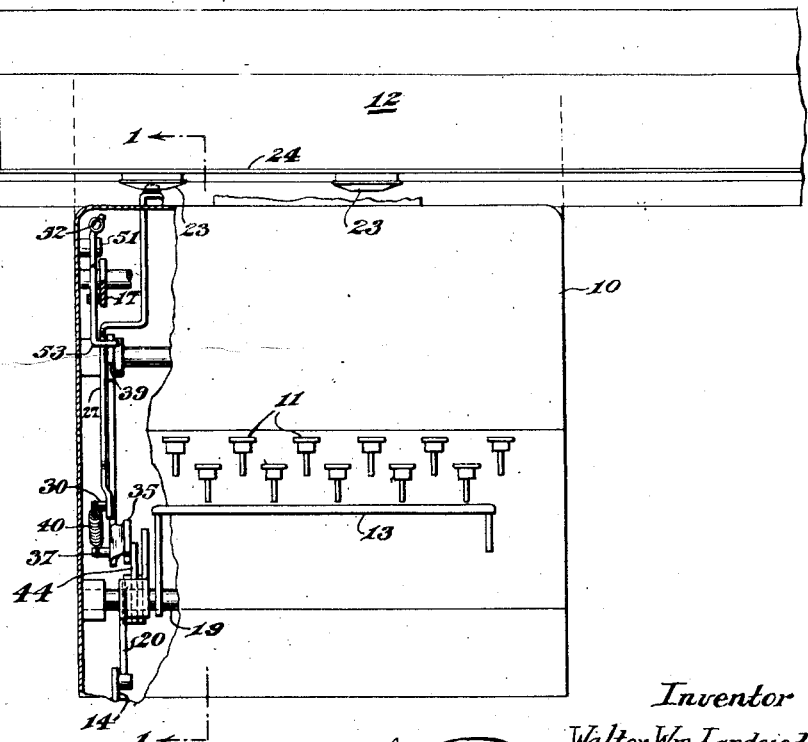

Patented Aug. 13, 1929.

1,724,880

UNITED STATES PATENT OFFICE.

WALTER WILLIAM LANDSIEDEL, OF CINCINNATI, OHIO, ASSIGNOR TO REMINGTON RAND INC., OF TONAWANDA, NEW YORK.

AUTOMATIC BLANK-OPERATION-CONTROLLING DEVICE.

Application filed September 20, 1927. Serial No. 220,711.

This invention relates to electric stroke adding and recording machines having an escapement type of movable carriage in which the escapement is controlled by the stroke.

This invention more particularly relates to a device controlled by the carriage for automatically taking a blank stroke in certain positions of the carriage.

One of the objects of this invention is to provide for a wide columnized sheet to be cross tabulated in this machine, an automatic skip for certain columns that are not normally used, and to provide access to these certain columns for special cases. This type of machine is usually adaptable to ordinary vertical column work during which this device is automatically thrown out of operation by a special means so as not to interfere in the least with the normal operation of the machine.

Another object of this invention is to provide means for automatically taking an idle or blank stroke or operation prior to a subtotal or total stroke or operation.

Other objects will appear from the following description, reference being had to the drawings in which:—

Fig. 1 is a partial section on the line 1—1 of Fig. 5.

Fig. 2 is a similar section with the lever system in a stroke or operation position.

Fig. 3 is a partial section on the line 3—3 of Fig. 1.

Fig. 4 is a partial section on the line 1—1 of Fig. 5 with the normalizer thrown in.

Fig. 5 is a front view of a recording machine with a portion of the case broken away.

The invention has been applied to a Dalton adding machine shown generally in United States Letters Patent of B. H. Tingley No. 1,576,256 granted March 9, 1926. This patent shows in detail a carriage escapement mechanism (not shown in this application) which may be normalized by the operator by means shown and described in this application.

The carriage of this type of machine is usually provided with cams for controlling the machine to perform certain well known predetermined functions in certain columnar positions of the carriage. In this application, the carriage is provided with one or more cams for depressing the usual stroke bar as the carriage moves into a certain columnar position. This causes the machine to make an operation which may be a blank operation for the sole purposes of skipping this column, or an idle operation preceding a total-taking operation, or an operation for performing automatically other functions which it may be desirable to perform in this columnar position according to the requirements of the business in which this machine is used. In the drawings, the invention has been shown as a means for operating the stroke bar as the carriage moves into a certain columnar position.

The machine illustrated comprises a machine body 10, (Figs. 1, 2, 4 and 5), provided with a keyboard 11 for controlling the accumulation of items, and the printing of the items upon a record sheet in the carriage 12, in which upon the depression of a usual stroke bar 13, an electric switch arm 14 is thrown, causing the functioning of the usual mechanism which includes, when the machine is set for cross tabulation work, the escapement of the carriage for a predetermined distance to the left usually constituting a column space. This machine is also adapted for ordinary column work, in which the escapement mechanism is rendered inoperative. This is known as the normalized condition of the carriage. The carriage normalizing means comprises the usual bell crank 15, (Figs. 1, 2, 3 and 4), operable by a knob 16 into either of two positions, "A" and "B", and operates thru a fork connection the usual normalizing lever 17 which operates a normalizing cam shown in the patent referred to. When the said bell crank 15 is in position "B", (Fig. 3), the machine is normalized for vertical tabulation, and when it is in position "A" the machine is free for cross tabulation. This mechanism is not a part of the prevent invention but controls the same thru the action of a pin 18 in the said normalizing lever 17, as will be hereinafter described.

The stroke bar 13, (Figs. 1, 2, 4 and 5), is fixedly secured to a pivotally mounted shaft 19 upon which is also secured a usual switch arm 20 which throws the said switch arm 14, as heretofore described. The stroke bar, as shown in Fig. 1, is depressible to the position shown in dash-and-dot lines in Fig. 1 and in full lines in Figs. 2 and 4 and upon release resumes its upper or home position. This usual mechanism is operated automatically in certain positions of the carriage by means of a number of cams 23 which correspond to the said positions. These cams are fixedly secured to a bar 24 which is mounted on the carriage 12, and are placed so that upon movement of the carriage they will act upon a roll 25 on the upper arm 26 of a lever 27 and turn the lever in a clockwise direction upon the shaft 28, upon which this lever is pivotally mounted. The lower arm 29 of this lever carries a spring anchor 30 at its extremity and a stop surface 31, designated only in Fig. 4. A second lever 34 is also pivotally mounted on the shaft 28 and comprises a substantially L-shaped driving arm 35 having at its extremity an open receiving slot 36. A spring anchor 37 and also a stop pin 38 are fixedly secured to the said arm near the base of the L and a stop arm 39 extends from the shaft 28 at approximately a right angle to the driving arm 35. The arm 35 is coupled to the lever 27 by a spring 40 which is fastened under tension to spring anchors 37 and 30 respectively, thus normally holding the stop surface 31, designated in Fig. 4, against the stop pin 38 as shown in Figs. 1 and 2.

A throw lever 44, pivotally mounted on the shaft 19, has a horizontally bent lip 45 extending under an arm 47 yoked to the arm 20, and a pin 46 fastened in its end in operative engagement with the slot 36 of the lever 34. When the lever 34 is moved clockwise by the lever 27 when operated by the cam 23, it moves the throw lever counter-clockwise thru this pin slot connection. As the throw lever 44 is rocked counter-clockwise, it carries with it the arm 47 of the arm 20 by the action of the lip 45 upon the under side of the arm 47. The switch arm 14 is thereby automatically closed and the machine operated, upon which the escapement is freed and the carriage moves to the next column. After this operation, the entire lever system shown is brought back to its first position by the action of a spring 48 operating on the arm of the stroke bar 13. The above described action is shown in Figs. 1 and 2. In the former, neutral position is shown with the cam 23 out of engagement with the roll 25. In the latter view, the cam is in engagement with the roll 25 and the switch arm 14 is shown depressed by the action of the mechanism heretofore described.

Upon completion of the carriage travel to the left, it is returned to right in one operation. During this return movement, the stroke bar 13 is locked by a usual device not herein disclosed, so that no stroke or operation takes place as the cam passes the roll 25.

This device is rendered inoperative when the bell crank 15 is in the normalizing or vertical tabulating position "B" by the following mechanism. As the pin 18 in the normalizing lever 17 is moved down with the said normalizing lever into the position shown in Fig. 4, it allows an arm 50 which is pivoted on a stud 51 in the machine frame to be swung in a counter-clockwise direction by a spring 52. The arm 50 has on its free end a lip 53 which in the described normalized position shown in Fig. 4 engages with the arm 39 of the lever 34, thereby preventing clockwise movement of said lever when so urged by the lever 27 thru the spring 40. Fig. 4 shows the machine normalized upon a column containing a cam in which, thru the action of the said cam, the lever 27 is thrown, but the lever 34 remains inoperative due to the blocking position of the lever 50, the spring connection 40 taking up the tension.

The connection between the arm 47 of the switch arm 14 and the lever 44 permits the stroke bar 13 to be operated even though movement of the lever 34 and 44 is blocked by the arm 50 when the normalizing lever is in its normalizing position. It is therefore possible to make any number of entries in the columns corresponding to the positions of the cams 23 without any interference by the cams 23 or mechanism controlled thereby, by normalizing the carriage escapement mechanism as usual.

While the invention has been shown applied to a well-known type of adding machine, it is to be understood this has been done merely for purposes of description and is not to be considered a limitation on the claims.

What is claimed is:—

1. In a machine of the class described, the combination with a laterally shiftable carriage, and means for causing a motor to operate the machine; of means involving a plurality of yieldably connected elements for operating said first mentioned means when the carriage moves into a certain position, and means for holding an element of said connection for preventing operation of said first mentioned means by the carriage in said certain position.

2. In a machine of the class described, the combination with a laterally shiftable carriage, and means for causing a motor to operate the machine; of a yieldable connection between said carriage and said means for operating said means when the carriage is in a certain position, and means for causing said connection to yield to prevent operation of said first mentioned means when the carriage is in said position.

3. In a machine of the class described, the combination with a laterally shiftable carriage, and means for causing a motor to operate the machine; of a yieldable connection for operating said means when the carriage moves into a certain position, and means for causing the connection to yield to prevent operation of said first mentioned means by said carriage when in said position, the connection being such as to permit manual operation of said first mentioned means when the carriage is in said position.

4. In a machine of the class described, the combination with a laterally shiftable carriage, and means for causing a motor to operate the machine; of a cam mounted for movement with the carriage, a pivoted lever operated by said cam, an arm pivoted coaxially with said lever, a spring connecting said arm to said lever, a second pivoted arm connected to said first mentioned arm, a one-way connection between said second arm and the means for causing the motor to operate to cause said arm, when operated by said cam, to operate said means and to permit said means to be operated independently of said arm, and means for holding said first mentioned arm to prevent said cam from operating said means.

WALTER WM. LANDSIEDEL.